United States Patent
Guo et al.

(10) Patent No.: US 9,779,649 B2
(45) Date of Patent: Oct. 3, 2017

(54) BOUNDARY JUDGING METHOD AND DEVICE, AND DISPLAY DRIVING METHOD AND DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Renwei Guo, Beijing (CN); Xue Dong, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/030,861

(22) PCT Filed: Jul. 24, 2015

(86) PCT No.: PCT/CN2015/085054
§ 371 (c)(1),
(2) Date: Apr. 20, 2016

(87) PCT Pub. No.: WO2016/138727
PCT Pub. Date: Sep. 9, 2016

(65) Prior Publication Data
US 2016/0379540 A1 Dec. 29, 2016

(30) Foreign Application Priority Data
Mar. 2, 2015 (CN) .......................... 2015 1 0093115

(51) Int. Cl.
*G09G 5/02* (2006.01)
*G09G 3/20* (2006.01)
(Continued)

(52) U.S. Cl.
CPC ........... *G09G 3/2003* (2013.01); *G09G 3/003* (2013.01); *H04N 13/0409* (2013.01);
(Continued)

(58) Field of Classification Search
CPC .... G09G 3/003; G09G 3/2003; G09G 3/2074; G09G 2300/0443; G09G 2320/0626;
(Continued)

(56) References Cited

U.S. PATENT DOCUMENTS

| 2005/0001542 A1* | 1/2005 | Kiguchi | .............. H01L 27/3216 313/504 |
| 2009/0168167 A1* | 7/2009 | Hiroya | ............... G02B 27/2214 359/477 |

(Continued)

FOREIGN PATENT DOCUMENTS

| CN | 101271571 A | 9/2008 |
| CN | 101727852 A | 6/2010 |

(Continued)

OTHER PUBLICATIONS

Chinese International Search Report and Written Opinion including English translation dated Dec. 15, 2015, for corresponding PCT Application No. PCT/CN2015/085054.

*Primary Examiner* — Joe H Cheng
(74) *Attorney, Agent, or Firm* — Kinney & Lange, P.A.

(57) ABSTRACT

A boundary judging method for a 3D display apparatus includes: dividing each of a first picture and a second picture to be displayed into a plurality of theoretical pixel units and determining color components of each of the theoretical pixel units; determining, for each sub-pixel for displaying each of the first and second pictures, a luminance of the each sub-pixel according to a color component, corresponding to a color of the each sub-pixel, of the theoretical pixel units that are covered by a preset sampling region corresponding to the each sub-pixel and that belong to the corresponding picture; and determining, for each of the first and second pictures, a boundary between adjacent two of sub-pixels of each color in the corresponding picture according to a luminance difference between the adjacent two of the sub-pixels of the each color.

20 Claims, 7 Drawing Sheets

(51) Int. Cl.
*G09G 3/00* (2006.01)
*H04N 13/04* (2006.01)

(52) U.S. Cl.
CPC ..... *H04N 13/0422* (2013.01); *H04N 13/0497* (2013.01); *G09G 2300/0443* (2013.01); *G09G 2300/0452* (2013.01); *G09G 2320/029* (2013.01); *G09G 2320/0626* (2013.01)

(58) Field of Classification Search
CPC ............ G09G 2320/0646; G02B 27/22; G02B 27/2214; H04N 13/0409; H04N 13/0497
See application file for complete search history.

(56) References Cited

U.S. PATENT DOCUMENTS

| | | | | |
|---|---|---|---|---|
| 2011/0234582 | A1* | 9/2011 | Daiku | G02B 27/2214 345/419 |
| 2012/0081358 | A1 | 4/2012 | Nakamura et al. | |
| 2012/0223941 | A1* | 9/2012 | Sekine | H04N 13/0422 345/419 |
| 2013/0223761 | A1* | 8/2013 | Chang | G06T 7/60 382/286 |
| 2014/0029095 | A1* | 1/2014 | Allio | H04N 13/0404 359/464 |
| 2014/0240475 | A1* | 8/2014 | Shigemura | H04N 13/0406 348/59 |
| 2015/0371583 | A1* | 12/2015 | Guo | G09G 3/2074 345/694 |
| 2016/0247465 | A1* | 8/2016 | Chen | G09G 3/3607 |
| 2016/0275844 | A1* | 9/2016 | Guo | G09G 3/003 |
| 2016/0277722 | A1* | 9/2016 | Guo | H04N 13/0422 |
| 2016/0343284 | A1* | 11/2016 | Sun | H01L 51/0011 |
| 2016/0351116 | A1* | 12/2016 | Sun | H01L 27/3218 |
| 2016/0379533 | A1* | 12/2016 | Guo | G09G 3/20 345/694 |

FOREIGN PATENT DOCUMENTS

| | | |
|---|---|---|
| CN | 103927974 A | 7/2014 |
| CN | 104200793 A | 12/2014 |
| CN | 104599625 A | 5/2015 |

* cited by examiner

BOUNDARY JUDGING METHOD AND DEVICE, AND DISPLAY DRIVING METHOD AND DEVICE

CROSS-REFERENCE TO RELATED APPLICATION

This application is the U.S. National Phase of PCT Application No. PCT/CN2015/085054 filed Jul. 24, 2015 for "Boundary Judging Method and Device, and Display Driving Method and Device" by R. Guo and Xue Dong.

BACKGROUND

1. Technical Field

Embodiments of the present invention relate to the field of display technology, and particularly to a boundary judging method and device, and a display driving method and device.

2. Description of the Related Art

Pentile technique will result in a serrated boundary so that the boundary is relatively blurry. It is necessary to use a corresponding algorithm to adjust luminance at the boundary so that the boundary is clearly displayed.

SUMMARY

In a first aspect, embodiments of the present invention provide a boundary judging method for a 3D display apparatus, and the boundary judging method comprises:

dividing each of a first picture and a second picture to be displayed into a plurality of theoretical pixel units and determining color components of each of the theoretical pixel units;

determining, for each sub-pixel for displaying each of the first and second pictures, a luminance of the each sub-pixel according to a color component, corresponding to a color of the each sub-pixel, of the theoretical pixel units that are covered by a preset sampling region corresponding to the each sub-pixel and that belong to the corresponding picture; and determining, for each of the first and second pictures, a boundary between adjacent two of sub-pixels of each color in the corresponding picture according to a luminance difference between the adjacent two of the sub-pixels of the each color.

In a second aspect, embodiments of the present invention also provide a display driving method comprising steps of:

determining a boundary between adjacent two of sub-pixels of each color in each picture, for example according to the abovementioned boundary judging method;

increasing a luminance of one, having a greater luminance, of the adjacent two of the sub-pixels of the each color on both sides of the boundary according to a first preset strategy and/or decreasing a luminance of the other, having a less luminance, of the adjacent two of the sub-pixels of the each color according to a second preset strategy; and displaying according to the adjusted luminances.

In a third aspect, embodiments of the present invention also provide a boundary judging device for a 3D display apparatus, and the boundary judging device comprises:

a pixel dividing unit configured for dividing each of a first picture and a second picture to be displayed into a plurality of theoretical pixel units and determining color components of each of the theoretical pixel units;

a luminance determining unit configured for determining, for each sub-pixel for displaying each of the first and second pictures, a luminance of the each sub-pixel according to a color component, corresponding to a color of the each sub-pixel, of the theoretical pixel units that are covered by a preset sampling region corresponding to the each sub-pixel and that belong to the corresponding picture; and a boundary judging unit configured for determining, for each of the first and second pictures, a boundary between adjacent two of sub-pixels of each color in the corresponding picture according to a luminance difference between the adjacent two of the sub-pixels of the each color.

In a fourth aspect, embodiments of the present invention also provide a display driving device, and the display driving device comprises:

a boundary judging device configured for determining a boundary between adjacent two of sub-pixels of each color in each picture, for example the abovementioned boundary judging device;

a luminance adjusting unit configured for, after the boundary between the adjacent two of the sub-pixels of the each color in the each picture is determined by the boundary judging device, increasing a luminance of one, having a greater luminance, of the adjacent two of the sub-pixels of the each color on both sides of the boundary according to a first preset strategy and/or decreasing a luminance of the other, having a less luminance, of the adjacent two of the sub-pixels of the each color according to a second preset strategy; and a display driving unit configured for displaying according to the adjusted luminances.

BRIEF DESCRIPTION OF THE DRAWINGS

FIG. 3 is a schematic structural diagram showing a possible structure of an array of pixels of a 3D display apparatus to which the methods shown in FIGS. 1 and 2 are applied;

FIG. 4 is a schematic distributional diagram of a possible grating array corresponding to the array of pixels shown in FIG. 3;

FIG. 5 shows a distribution of a sampling region of a red sub-pixel in a row R12 and a column S3;

FIG. 6 shows a distribution of sampling regions of red sub-pixels in a row R12 and a column S3, a row R9 and a column S3, and a row R9 and a column S5;

FIG. 7 shows a possible distribution of boundary;

FIG. 8 is a schematic distributional diagram of sampling regions after some of the sampling regions are adjusted for the boundary shown in FIG. 7;

FIG. 9 shows another possible distribution of boundary;

FIG. 10 is a schematic distributional diagram of sampling regions after some of the sampling regions are adjusted for the boundary shown in FIG. 9;

DETAILED DESCRIPTION OF THE EMBODIMENTS

A further description of the invention will be made in detail as below with reference to embodiments of the present invention taken in conjunction with the accompanying drawings. The following embodiments are intended to explain the present invention, and the present invention should not be construed as being limited to the embodiment set forth herein.

Figure 1:
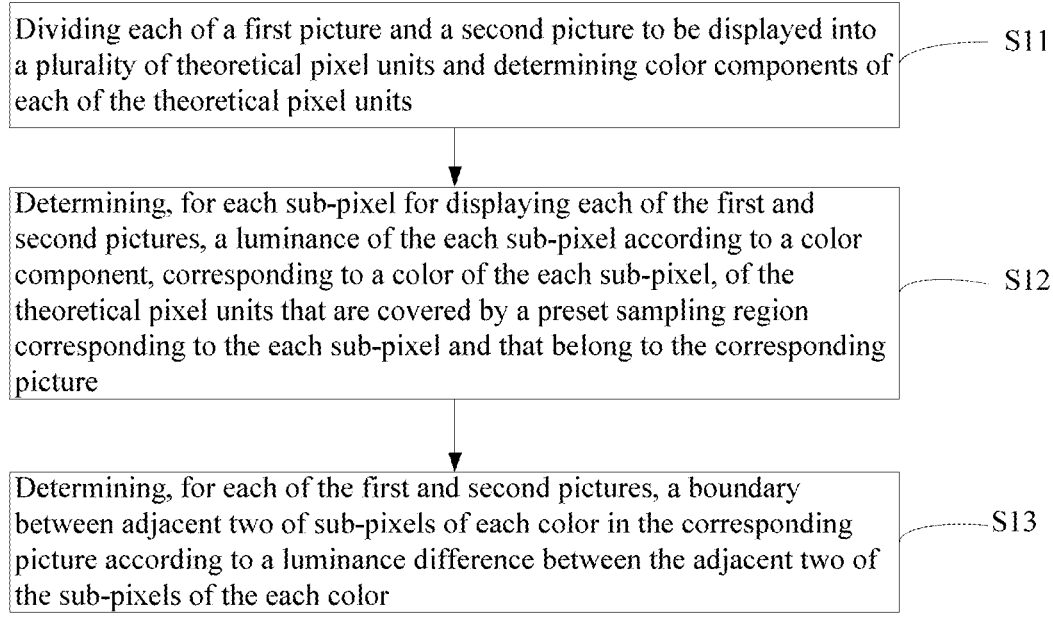
FIG. 1 is a schematic flow diagram of a boundary judging method according to an embodiment of the present invention.

An embodiment of the present invention provides a boundary judging method applicable to a 3D display apparatus. As shown in FIG. 1, the boundary judging method may comprise:

a step S11 of dividing each of a first picture and a second picture to be displayed into a plurality of theoretical pixel units and determining color components of each of the theoretical pixel units.

Specifically, one pixel in the display apparatus corresponds to one theoretical pixel unit. In the step S11, the first picture may be divided into the plurality of theoretical pixel units according to a theoretically available number of pixels of the 3D display apparatus. After that, the color components of red, green, and blue in each theoretical pixel unit are determined. Likewise, the plurality of theoretical pixel units corresponding to the second picture and the color components of red, green, and blue in each of the theoretical pixel units are obtained.

The boundary judging method may further comprise a step S12 of determining, for each sub-pixel for displaying each of the first and second pictures, a luminance of the each sub-pixel according to a color component, corresponding to a color of the each sub-pixel, of the theoretical pixel units that are covered by a preset sampling region corresponding to the each sub-pixel and that belong to the corresponding picture.

Specifically, the step S12 may comprise: for each sub-pixel, determining an overlapping area of a rectangular sampling region corresponding to the each sub-pixel and each of the plurality of theoretical pixel units, and the color component, corresponding to the color of the each sub-pixel, of the each theoretical pixel unit; determining a product of the overlapping area corresponding to the each theoretical pixel unit and the corresponding color component; and determining the luminance of the each sub-pixel according to a sum of the products and an area of the sampling region. Of course, in practical application, after a sampling is performed by means of the rectangular sampling region, the luminance of the corresponding sub-pixel may also be determined in other ways. This is no longer described in detail in the embodiments of the present invention.

The boundary judging method may further comprise a step S13 of determining, for each of the first and second pictures, a boundary between adjacent two of sub-pixels of each color in the corresponding picture according to a luminance difference between the adjacent two of the sub-pixels of the each color.

With the boundary judging method according to the embodiments of the present invention, the boundary in the 3D display apparatus can be accurately determined.

According to embodiments of the present invention, the step S13 may specifically comprise:

for the adjacent two of the sub-pixels of the same color for displaying the same picture, judging that the boundary between the adjacent two of the sub-pixels of the each or the same color is located between a first sub-pixel and a second sub-pixel of the adjacent two of the sub-pixels when a corresponding luminance of the first sub-pixel is 1.5-2 times as large as that of the second sub-pixel.

In practical application, if the corresponding luminance of the first sub-pixel is more than two times greater than that of the second sub-pixel, generally the boundary is relatively clear. In this case, it is not necessary to perform the sequent luminance adjusting process. However, if the corresponding luminance of the first sub-pixel is 1-1.5 times as large as that of the second sub-pixel, then it is indicated that there is probably no boundary between the adjacent two of the sub-pixels. In the embodiments of the present invention, judging that the boundary between the adjacent two of the sub-pixels of the each color is located between a first sub-pixel and a second sub-pixel of the adjacent two of the sub-pixels when a corresponding luminance of the first sub-pixel is 1.5-2 times as large as that of the second sub-pixel. Otherwise, it is judged that the boundary between the adjacent two of the sub-pixels of the each color is not located between the first sub-pixel and the second sub-pixel of the adjacent two of the sub-pixels, thereby avoiding the sequent luminance adjusting process.

According to embodiments of the present invention, it is judged that the boundary between the adjacent two of the sub-pixels of the each color is located between the first sub-pixel and the second sub-pixel of the adjacent two of the sub-pixels when the corresponding luminance of the first sub-pixel here is 1.7 times as large as that of the second sub-pixel.

Figure 2:
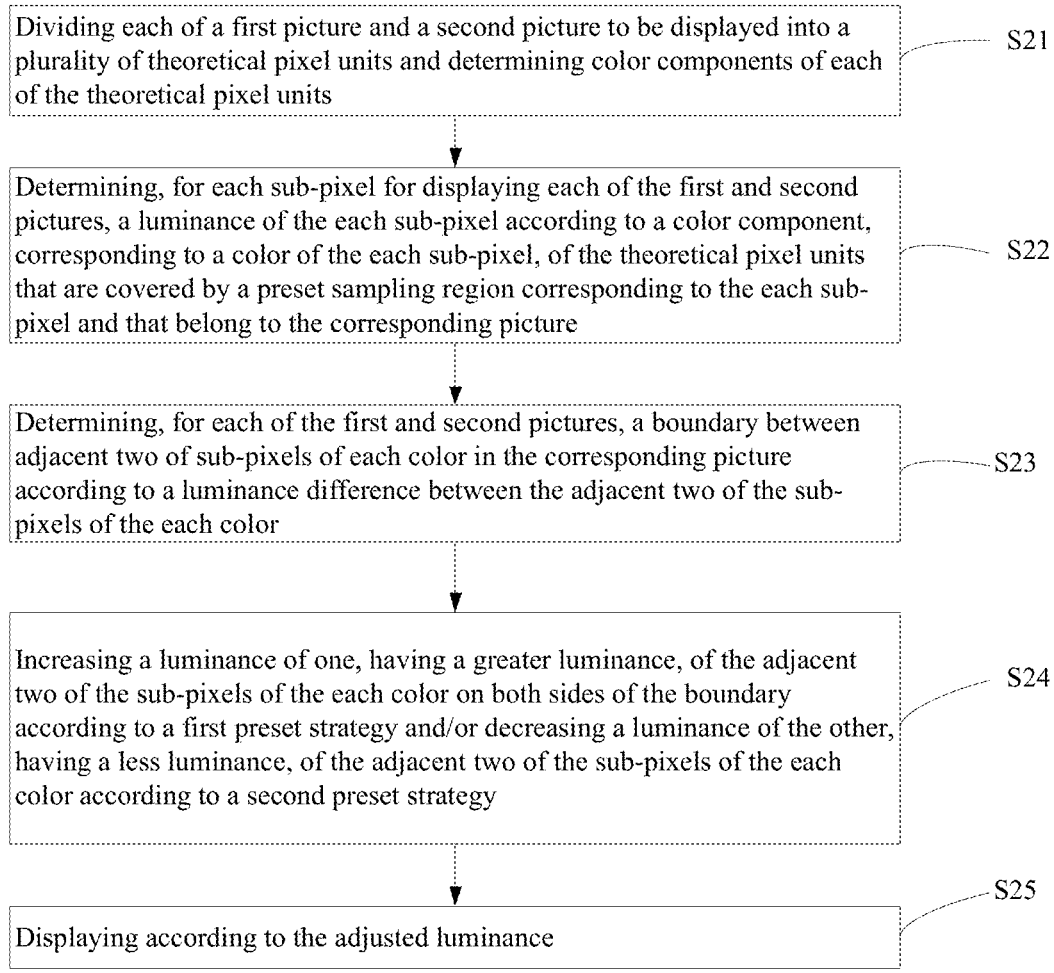
FIG. 2 is a schematic flow diagram of a display driving method according to an embodiment of the present invention.

On the other hand, embodiments of the present invention also provide a display driving method. As shown in FIG. 2, the display driving method comprises:

steps S21-S23 which are the same as the steps S11-S13;

a step S24 of increasing a luminance of one, having a greater luminance, of the adjacent two of the sub-pixels of the each color on both sides of the boundary according to a first preset strategy and/or decreasing a luminance of the other, having a less luminance, of the adjacent two of the sub-pixels of the each color according to a second preset strategy; and a step S25 of displaying according to the adjusted luminances.

With the display driving method according to the embodiments of the present invention, a luminance difference between two of the sub-pixels on both sides of the boundary of the sub-pixels of the same color in one picture can be increased so that the boundary is made clearer.

The first preset strategy here may mean increasing the luminance of the one, having the greater luminance, of the adjacent two of the sub-pixels of the each color by a preset proportion or decreasing the luminance of the other, having the less luminance, of the adjacent two of the sub-pixels of the each color by a preset proportion. For example, the luminance of the one, having the greater luminance, of the adjacent two of the sub-pixels of the each color is increased by 30% or the luminance of the other, having the less luminance, of the adjacent two of the sub-pixels of the each color is decreased by 30%.

Optionally, in embodiments of the present invention, the step S24 here may specifically comprise:

expanding a sampling region corresponding to the one, having the greater luminance, of the adjacent two of the sub-pixels of the each color on both sides of the boundary, and accordingly contracting a sampling region corresponding to the other, having the less luminance, of the adjacent two of the sub-pixels, according to a third preset strategy. For example, the sampling region corresponding to the one, having the greater luminance, of the adjacent two of the sub-pixels is expanded towards a boundary of the other, having the less luminance, of the adjacent two of the sub-pixels, to a boundary, facing the other of the adjacent two of the sub-pixels, of a theoretical pixel unit in which the determined boundary is currently located.

In this way, the sampling region of the sub-pixel having the less luminance can be contracted at the boundary, reducing or avoiding sampling of the theoretical pixel unit located at the boundary. As a result, the luminance of the sub-pixel having the less luminance is decreased. Furthermore, in this way, the displayed boundary can be made more coincident with an actual boundary situation.

Specifically, the third preset strategy here may mean that the sampling region of the one, having the greater luminance, of the adjacent two of the sub-pixels may be expanded towards a boundary of the other, having the less luminance, of the adjacent two of the sub-pixels, to a boundary, facing the other of the adjacent two of the sub-pixels, of a theoretical pixel unit in which the determined boundary is currently located.

Figures 3, 4:
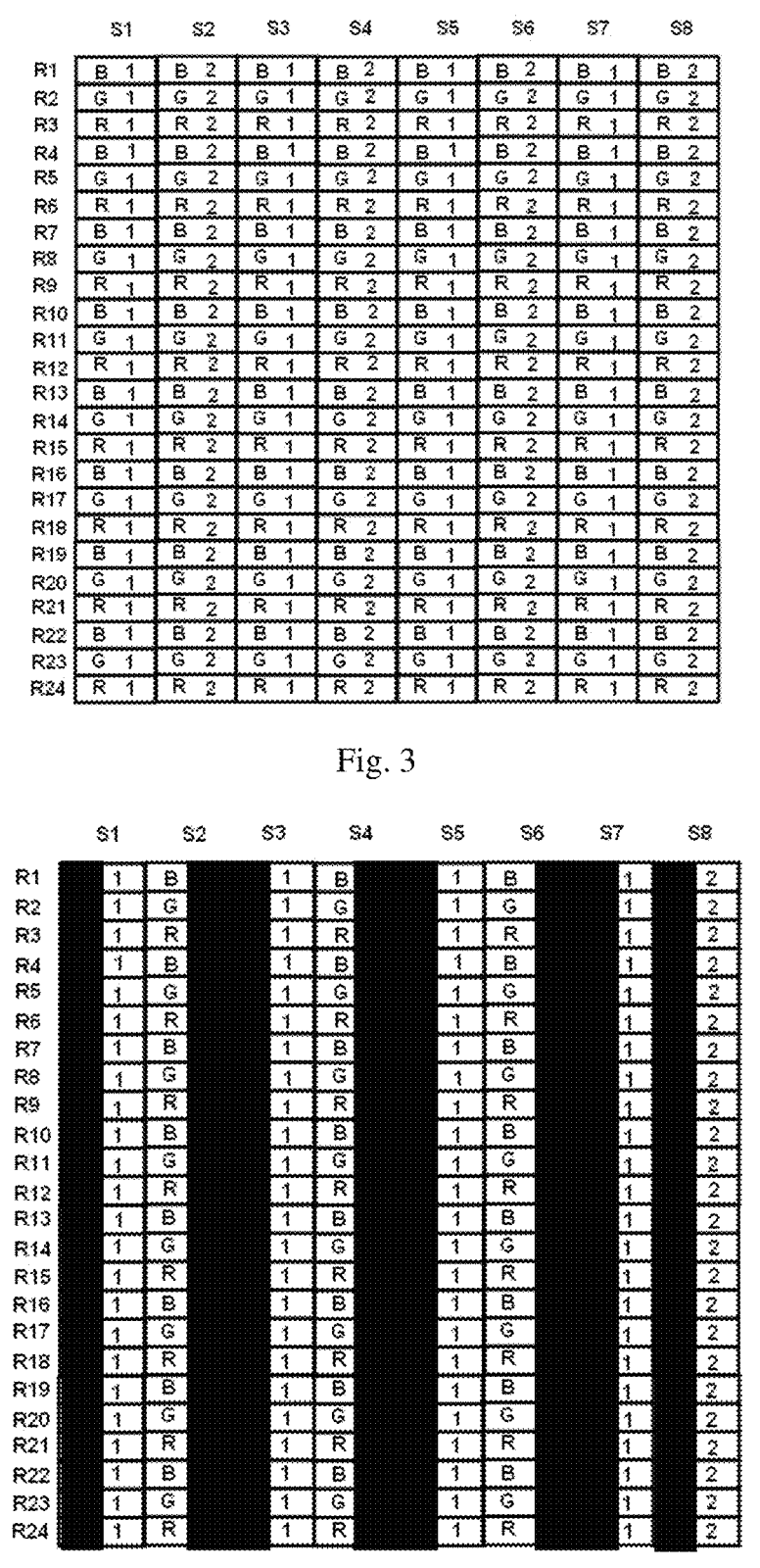

The boundary judging method and the corresponding display driving method, according to the embodiments of the present invention, are described in detail in combination with a specific array of pixels and a specific grating array as follows. The 3D display apparatus may comprise an array of pixels and a grating array. FIG. 3 shows a schematic diagram of a possible array of pixels including 8 columns (S1-S8) by 24 rows (R1-R24) of sub-pixels, of which odd-numbered columns S1, S3, S5 and S7 of sub-pixels are used for displaying a right-eye picture, and even-numbered columns S2, S4, S6 and S8 of sub-pixels are used for displaying a left-eye picture. In each column, blue sub-pixels, green sub-pixels and red sub-pixel are alternately arranged. In order to facilitate distinguishing of them, B1, G1 and R1 denote blue sub-pixels, green sub-pixels and red sub-pixel for displaying the right-eye picture, respectively, and, B2, G2 and R2 denote blue sub-pixels, green sub-pixels and red sub-pixel for displaying the left-eye picture, respectively.

FIG. 4 is a schematic distributional diagram also showing a grating array. The grating array blocks a right side of each of the columns of sub-pixels for displaying the left-eye picture and a left side of each of the columns of sub-pixels for displaying the right-eye picture. In this way, light emitted through the columns of sub-pixels for displaying the left-eye picture can be transmitted only left to be seen by a left eye, and light emitted through the columns of sub-pixels for displaying the right-eye picture can be transmitted only right to be seen by a right eye. In this way, with appropriate control, different pictures can be seen by the left and right eyes so as to achieve 3D displaying.

Figures 5, 6:
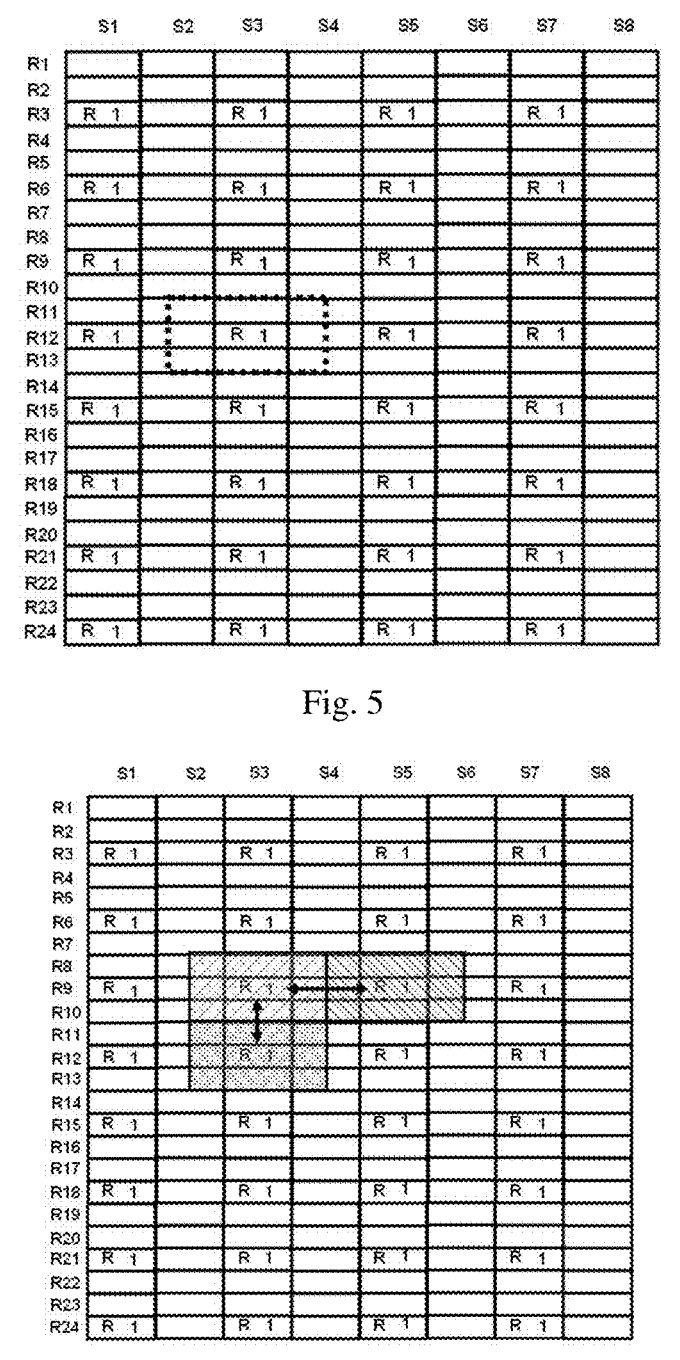

A description will be made in a specific manner of judgment of a boundary between red sub-pixels in a right-eye picture as follows. As shown in FIG. 5, for a red sub-pixel R1 in a row R12 and a column S3, a luminance of the red sub-pixel R1 is first determined according to a preset sampling region corresponding to the red sub-pixel R1. Referring to FIG. 5, the preset sampling region corresponding to the red sub-pixel R1 in the row R12 and the column S3 may be as shown by a rectangular box of dashed line in FIG. 5. Since red sub-pixels R1 in the right-eye picture are uniformly arranged, preset sampling regions corresponding to the red sub-pixels R1 have the same size. A dimension of each of the preset sampling regions in a column direction is three times as large as a dimension of the sub-pixel in the column direction, and a dimension of each of the preset sampling regions in a row direction is twice as large as a dimension of the sub-pixel in the row direction. After that, the luminance of the red sub-pixel R1 in the row R12 and the column S3 is determined according to overlapping areas of theoretical pixel units covered by the preset sampling region in the right-eye picture and red components of the theoretical pixel units.

Referring to FIG. 6, a red sub-pixel R1 which is located on a right side of and adjacent to the red sub-pixel R1 in the row R9 and the column S3 is located in a row R9 and a column S5, and a red sub-pixel R1 which is located under and adjacent to the red sub-pixel R1 in the row R9 and the column S3 is located in a row R12 and a column S3. Luminances of the red sub-pixel R1 in the row R9 and the column S5 and of the red sub-pixel R1 in the row R12 and the column S3 are respectively determined in the abovementioned manner of determining the luminance of the red sub-pixel R1 in the row R12 and the column S3. It is determined whether or not a luminance difference between the red sub-pixel R1 in the row R9 and the column S3 and the red sub-pixel R1 in the row R9 and the column S5 is 0.5-1 times as large as a smaller one of the luminances of the red sub-pixel R1 in the row R9 and the column S3 and of the red sub-pixel R1 in the row R9 and the column S5. If it is judged that the luminance is 0.5-1 times as large as the smaller one of the luminances, then it is determined that there is a boundary between the two red sub-pixels. Accordingly, it is determined whether or not there is a boundary between the red sub-pixel R1 in the row R9 and the column S3 and the red sub-pixel in the row R12 and the column S3.

So far, a judging process of the boundaries between the red sub-pixel R1 in the row R9 and the column S3 and the adjacent red sub-pixels R1 located under the red sub-pixel R1 and between the red sub-pixel R1 in the row R9 and the column S3 and the adjacent red sub-pixels R1 located on the right side of the red sub-pixel R1 has been completed.

Figures 7, 8:
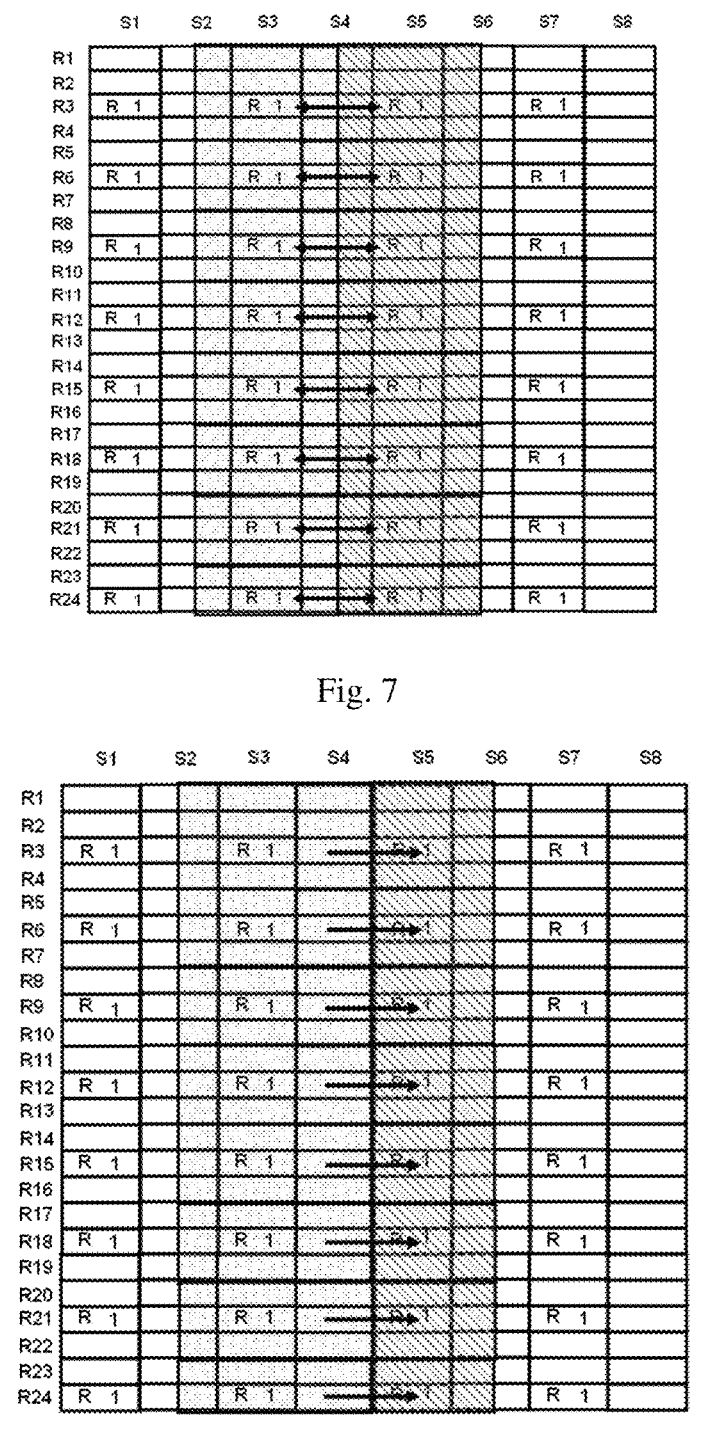

As shown in FIG. 7, assuming that it is judged according to the abovementioned boundary judging method that there is a boundary between the red sub-pixels R1 in the column S3 and the red sub-pixels R1 in the column S5 that is on the right side of the red sub-pixels R1 in the column S3, and the red sub-pixels R1 in the column S3 have a greater luminance, sampling regions of the red sub-pixels R1 in the column S3 are expanded towards the column S5 and correspondingly sampling regions of the red sub-pixels R1 in the column S5 are contracted, based on a display driving method according to embodiments of the present invention. As shown in FIG. 8, a right boundary of the sampling regions of the red sub-pixels R1 in the column S3 is displaced right from a center line of red sub-pixels in the column S4 to a boundary between the red sub-pixels in the column S4 and in the column S5. In this way, the sampling regions of the red sub-pixels in the column S5 can be contracted, and an overlapping area of the sampling regions of the red sub-pixels in the column S5 and the theoretical pixel units having a greater red component is decreased. As a result, the luminance of the red sub-pixels in the column S5 is decreased.

Figures 9, 10:
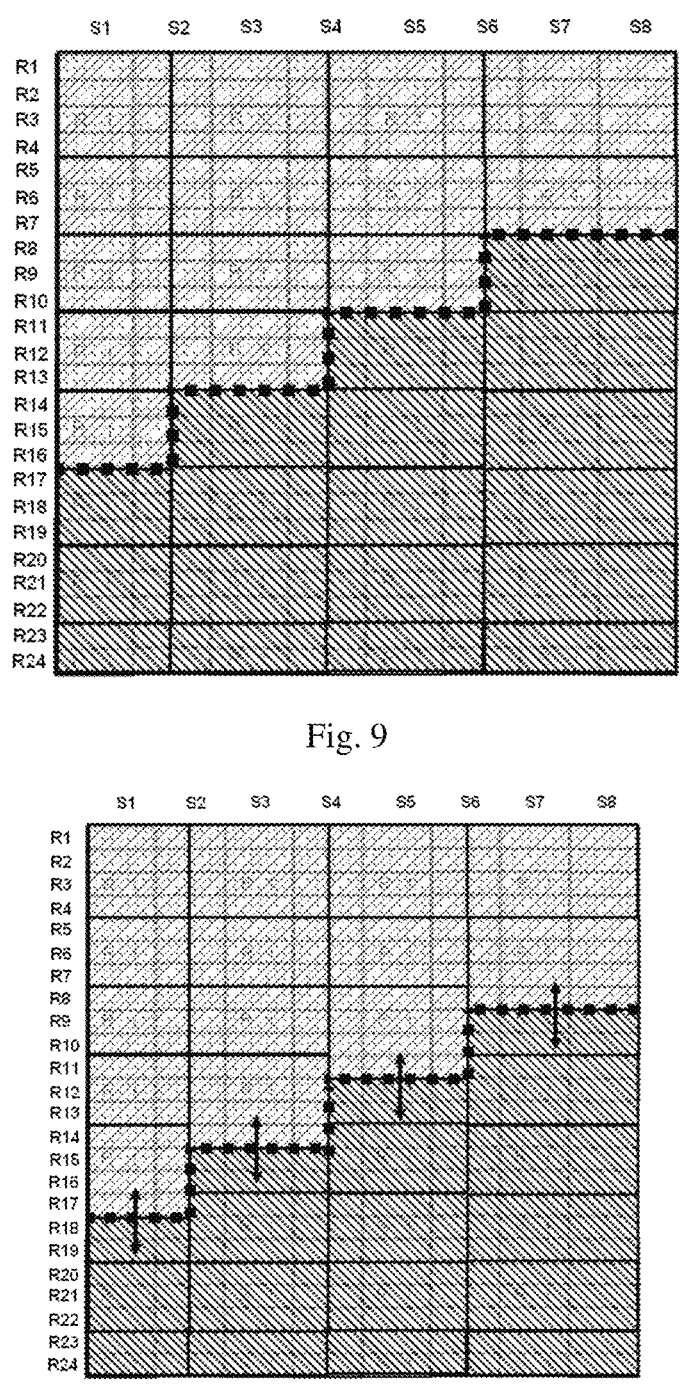

The boundary judging method and the display driving method according to the embodiments of the present invention can also be used to judge an irregular boundary and adjust a luminance at the irregular boundary. FIG. 9 shows a situation in which a boundary to be judged has a serrate shape. Assuming that red sub-pixels R1 above the boundary have a greater luminance while red sub-pixels R1 below the boundary have a less luminance, then, FIG. 10 may be referred to for adjusted sampling regions, the sampling regions corresponding to the red sub-pixels R1 above the boundary are expanded with respect to those in FIG. 9, while the sampling regions corresponding to the red sub-pixels R1 below the boundary are contracted with respect to those in FIG. 9. In addition, the boundary judging method according to the embodiments of the present invention may also be used in situations in which the sub-pixels are arranged in other manners (for example, in a delta pixel array or in a rhombic pixel array).

Figure 11:
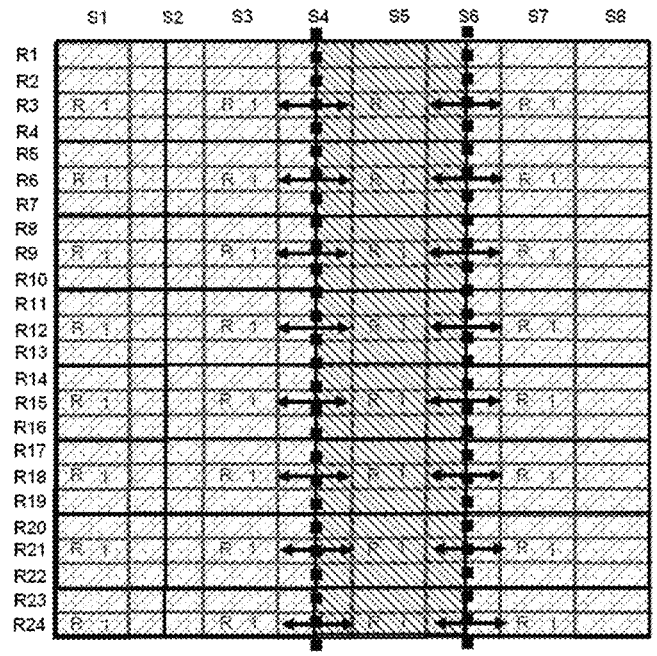
FIG. 11 shows a further possible distribution of boundary.
Figure 12:
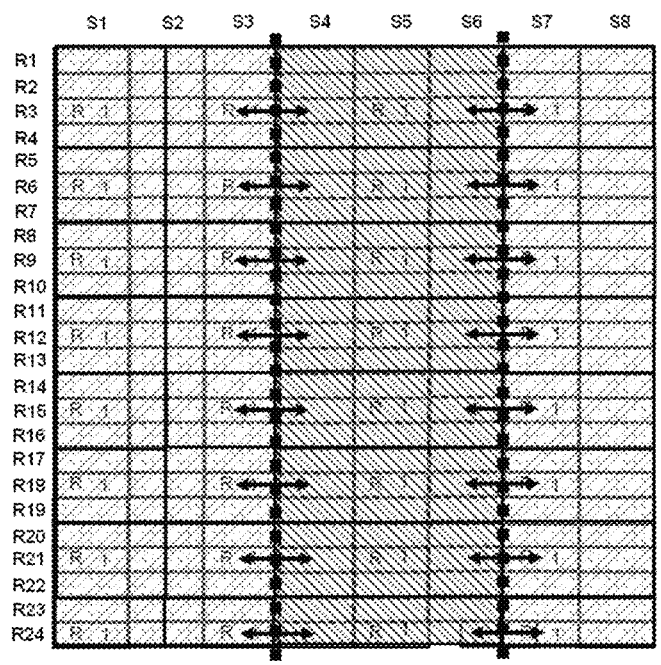
FIG. 12 is a schematic distributional diagram of sampling regions after some of the sampling regions are adjusted for the boundary shown in FIG. 11.

FIG. 11 also shows a situation in which red sub-pixels R1 in the column S5 and red sub-pixels R1 in the column S3 are located on both sides of a boundary, and the red sub-pixels R1 in the column S5 and red sub-pixels R1 in the column S7 are also located on both sides of another boundary. Assuming that the red sub-pixels R1 in the column S5 have a greater luminance than the red sub-pixels R1 in the column S3 and the red sub-pixels R1 in the column S7, then, after sampling regions are adjusted based on the display driving method according to the embodiments of the present invention, sampling regions of the red sub-pixels R1 in the column S5 are expanded towards the column S3 and the column S7 as shown in FIG. 12.

Boundary determining and display driving processes for blue and green sub-pixels in the right-eye picture may be identical with the abovementioned manners of determining the boundary of the red sub-pixels and adjusting the luminance of the red sub-pixels. Likewise, corresponding boundaries for sub-pixels of colors in the left-eye picture may also be determined according to the abovementioned method and corresponding display driving for the sub-pixels of the colors in the left-eye picture may also be performed according to the abovementioned method.

On the other hand, embodiments of the present invention also provide a boundary judging device for a 3D display apparatus, which may be used for performing the boundary judging method according to any of the above embodiments. The boundary judging device comprises:

a pixel dividing unit configured for dividing each of a first picture and a second picture to be displayed into a plurality of theoretical pixel units and determining color components of each of the theoretical pixel units;

a luminance determining unit configured for determining, for each sub-pixel for displaying each of the first and second pictures, a luminance of the each sub-pixel according to a color component, corresponding to a color of the each sub-pixel, of the theoretical pixel units that are covered by a preset sampling region corresponding to the each sub-pixel and that belong to the corresponding picture; and a boundary judging unit configured for determining, for each of the first and second pictures, a boundary between adjacent two of sub-pixels of each color in the corresponding picture according to a luminance difference between the adjacent two of the sub-pixels of the each color.

With the boundary judging device according to the embodiments of the present invention, the boundary in the 3D display apparatus can be accurately determined.

According to embodiments of the present invention, the boundary judging unit is further configured for judging that the boundary between the adjacent two of the sub-pixels of the each color is located between a first sub-pixel and a second sub-pixel of the adjacent two of the sub-pixels when a corresponding luminance of the first sub-pixel is 1.5-2 times as large as that of the second sub-pixel.

According to embodiments of the present invention, the boundary judging unit is further configured for judging that the boundary between the adjacent two of the sub-pixels of the each color is located between a first sub-pixel and a second sub-pixel of the adjacent two of the sub-pixels when a corresponding luminance of the first sub-pixel is 1.7 times as large as that of the second sub-pixel.

According to embodiments of the present invention, the 3D display apparatus comprises an array of pixels which comprises a delta pixel array or a rhombic pixel array.

According to embodiments of the present invention, the boundary comprises a serrate boundary or a straight line-shaped boundary, or, the boundary judging device is configured for judging a serrate boundary or a straight line-shaped boundary.

Embodiments of the present invention also provide a display driving device which may be used for performing the display driving method according to any of the above embodiments. The display driving device comprises:

a boundary judging device configured for determining a boundary between adjacent two of the sub-pixels of each color in each picture, for example the abovementioned boundary judging device;

a luminance adjusting unit configured for, after the boundary between the adjacent two of the sub-pixels of the each color in the each picture is determined by the boundary judging device, increasing a luminance of one, having a greater luminance, of the adjacent two of the sub-pixels of the each color on both sides of the boundary according to a first preset strategy and/or decreasing a luminance of the other, having a less luminance, of the adjacent two of the sub-pixels of the each color according to a second preset strategy; and a display driving unit configured for displaying according to the adjusted luminances.

With the display driving device according to the embodiments of the present invention, the boundary in the 3D display apparatus can be made clearer.

According to embodiments of the present invention, the luminance adjusting unit is further configured for expanding a sampling region corresponding to the one, having the greater luminance, of the adjacent two of the sub-pixels of the each color on both sides of the boundary towards the other, having the less luminance, of the adjacent two of the sub-pixels and adaptively contracting a sampling region corresponding to the other, having the less luminance, of the adjacent two of the sub-pixels, according to a third preset strategy.

According to embodiments of the present invention, the luminance adjusting unit is further configured for expanding the sampling region corresponding to the one, having the greater luminance, of the adjacent two of the sub-pixels towards a boundary of the other, having the less luminance, of the adjacent two of the sub-pixels, to a boundary, facing the other of the adjacent two of the sub-pixels, of a theoretical pixel unit in which the determined boundary is currently located.

According to embodiments of the present invention, the luminance adjusting unit is further configured for increasing the luminance of the one, having the greater luminance, of the adjacent two of the sub-pixels of the each color on both sides of the boundary by one preset proportion and/or decreasing the luminance of the other, having the less luminance, of the adjacent two of the sub-pixels of the each color by another preset proportion. For example, the one preset proportion is 30% and/or the another preset proportion is 30%.

With the boundary judging method according to the embodiments of the present invention, a boundary is determined for each of 3D pictures. The boundary in a 3D display apparatus can be accurately determined. With the display driving method according to the embodiments of the present invention, the boundary in the 3D display apparatus can be made clearer.

The above embodiments are only used to explain the present invention, and should not be construed to limit the present invention. It will be understood by those skilled in the art that various changes and modifications may be made therein without departing from the spirit of the present invention, the scope of which is defined in the appended claims and their equivalents.

What is claimed is:

1. A boundary judging method for a 3D display apparatus, the boundary judging method comprising:
dividing each of a first picture and a second picture to be displayed into a plurality of theoretical pixel units and determining color components of each of the theoretical pixel units;
determining, for each sub-pixel for displaying each of the first and second pictures, a luminance of the each sub-pixel according to a color component, corresponding to a color of each sub-pixel, of the theoretical pixel units that are covered by a preset sampling region corresponding to each sub-pixel and that belong to the corresponding picture; and
determining, for each of the first and second pictures, a boundary between adjacent two sub-pixels of each color in the corresponding picture according to a luminance difference between the adjacent two sub-pixels of each color.

2. The boundary judging method of claim 1, wherein determining the boundary comprises:
judging that the boundary between the adjacent two sub-pixels of each color is located between a first sub-pixel and a second sub-pixel of the adjacent two sub-pixels when a corresponding luminance of the first sub-pixel is 1.5-2 times as large as that of the second sub-pixel.

3. The boundary judging method of claim 2, wherein: judging that the boundary between the adjacent two sub-pixels of each color is located between the first sub-pixel and the second sub-pixel of the adjacent two sub-pixels when the corresponding luminance of the first sub-pixel is 1.7 times as large as that of the second sub-pixel.

4. The boundary judging method of claim 1, wherein: the 3D display apparatus comprises an array of pixels which comprises a delta pixel array or a rhombic pixel array.

5. The boundary judging method of claim 1, wherein: the boundary comprises a serrated boundary or a straight line-shaped boundary.

6. A display driving method for a 3D display apparatus, the display driving method comprising steps of:
determining a boundary between two adjacent sub-pixels of each color in each picture; and
increasing a luminance of one, having a greater luminance, of the adjacent two sub-pixels of each color on both sides of the boundary according to a first preset strategy and/or decreasing a luminance of the other, having a lesser luminance, of the adjacent two sub-pixels of each color according to a second preset strategy; and
displaying according to the adjusted luminances.

7. The display driving method of claim 6, wherein: the step of decreasing the luminance comprises:
expanding a sampling region corresponding to the one, having the greater luminance, of the adjacent two sub-pixels of each color on both sides of the boundary towards the other, having the lesser luminance, of the adjacent two sub-pixels, and adaptively contracting a sampling region corresponding to the other, having the lesser luminance, of the adjacent two sub-pixels, according to a third preset strategy.

8. The display driving method of claim 7, wherein: the step of expanding the sampling region corresponding to the one of the adjacent two sub-pixels and adaptively contracting the sampling region corresponding to the other comprises:
expanding the sampling region corresponding to the one, having the greater luminance, of the adjacent two sub-pixels towards a boundary of the other, having the lesser luminance, of the adjacent two sub-pixels, to a boundary, facing the other of the adjacent two sub-pixels, of a theoretical pixel unit in which the determined boundary is currently located.

9. The display driving method of claim 6, wherein: the step of increasing the luminance of the one of the adjacent two sub-pixels and/or decreasing the luminance of the other comprises:
increasing the luminance of the one, having the greater luminance, of the adjacent two sub-pixels of each color on both sides of the boundary by one preset proportion and/or decreasing the luminance of the other, having the lesser luminance, of the adjacent two sub-pixels of each color by another preset proportion.

10. The display driving method of claim 9, wherein:
the one preset proportion is 30% and/or the another preset proportion is 30%.

11. A boundary judging device for a 3D display apparatus, the boundary judging device comprising:
a pixel dividing unit configured for dividing each of a first picture and a second picture to be displayed into a plurality of theoretical pixel units and determining color components of each of the theoretical pixel units;
a luminance determining unit configured for determining, for each sub-pixel for displaying each of the first and second pictures, a luminance of each sub-pixel according to a color component, corresponding to a color of each sub-pixel, of the theoretical pixel units that are covered by a preset sampling region corresponding to each sub-pixel and that belong to the corresponding picture; and
a boundary judging unit configured for determining, for each of the first and second pictures, a boundary between two adjacent sub-pixels of each color in the corresponding picture according to a luminance difference between the adjacent two sub-pixels of each color.

12. The boundary judging device of claim 11, wherein: the boundary judging unit is further configured for judging that the boundary between the adjacent two sub-pixels of each color is located between a first sub-pixel and a second sub-pixel of the adjacent two sub-pixels when a corresponding luminance of the first sub-pixel is 1.5-2 times as large as that of the second sub-pixel.

13. The boundary judging device of claim 12, wherein: the boundary judging unit is further configured for judging that the boundary between the adjacent two sub-pixels of each color is located between the first sub-pixel and the second sub-pixel of the adjacent two sub-pixels when the corresponding luminance of the first sub-pixel is 1.7 times as large as that of the second sub-pixel.

14. The boundary judging device of claim 11, wherein: the 3D display apparatus comprises an array of pixels which comprises a delta pixel array or a rhombic pixel array.

15. The boundary judging device of claim 11, wherein: the boundary comprises a serrated boundary or a straight line-shaped boundary.

16. A display driving device comprising:
a boundary judging device configured for determining a boundary between two adjacent sub-pixels of each color in a picture;

a luminance adjusting unit configured for, after the boundary between the adjacent two sub-pixels of each color in the picture is determined by the boundary judging device, increasing a luminance of one, having a greater luminance, of the adjacent two sub-pixels of each color on both sides of the boundary according to a first preset strategy and/or decreasing a luminance of the other, having a lesser luminance, of the adjacent two sub-pixels of each color according to a second preset strategy; and a display driving unit configured for displaying according to the adjusted luminances.

17. The display driving device of claim 16, wherein:

the luminance adjusting unit is further configured for expanding a sampling region corresponding to the one, having the greater luminance, of the adjacent two sub-pixels of each color on both sides of the boundary towards the other, having the lesser luminance, of the adjacent two sub-pixels and adaptively contracting a sampling region corresponding to the other, having the lesser luminance, of the adjacent two sub-pixels, according to a third preset strategy.

18. The display driving device of claim 17, wherein:

the luminance adjusting unit is further configured for expanding the sampling region corresponding to the one, having the greater luminance, of the adjacent two sub-pixels towards a boundary of the other, having the lesser luminance, of the adjacent two sub-pixels, to a boundary, facing the other of the adjacent two of the sub-pixels, of a theoretical pixel unit in which the determined boundary is currently located.

19. The display driving device of claim 16, wherein:

the luminance adjusting unit is further configured for increasing the luminance of the one, having the greater luminance, of the adjacent two sub-pixels of each color on both sides of the boundary by one preset proportion and/or decreasing the luminance of the other, having the lesser luminance, of the adjacent two sub-pixels of each color by another preset proportion.

20. The display driving device of claim 19, wherein:

the one preset proportion is 30% and/or the another preset proportion is 30%.

\* \* \* \* \*